(12) United States Patent
Nagaraj et al.

(10) Patent No.: US 8,208,548 B2
(45) Date of Patent: Jun. 26, 2012

(54) VIDEO ENCODING

(75) Inventors: Raghavendra C. Nagaraj, San Diego, CA (US); Kai Wang, San Diego, CA (US); Narendranath Malayath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1344 days.

(21) Appl. No.: 11/351,911

(22) Filed: Feb. 9, 2006

(65) Prior Publication Data

US 2007/0183500 A1 Aug. 9, 2007

(51) Int. Cl.
H04B 1/66 (2006.01)
(52) U.S. Cl. ......... 375/240.16; 375/240.01; 375/240.12; 375/240.18; 375/240.22; 375/240.24
(58) Field of Classification Search .............. 375/240.01, 375/240.12, 240.16, 240.18, 240.22, 240.24
See application file for complete search history.

(56) References Cited

U.S. PATENT DOCUMENTS

| 2006/0215759 | A1* | 9/2006 | Mori ................... | 375/240.16 |
| 2006/0262854 | A1* | 11/2006 | Lelescu et al. .......... | 375/240.16 |
| 2007/0009026 | A1* | 1/2007 | Kwon et al. ............ | 375/240.03 |

FOREIGN PATENT DOCUMENTS

| EP | 1727370 | 11/2006 |
| JP | 2001189934 A | 7/2001 |
| JP | 2001309380 A | 11/2001 |
| JP | 2003230149 A | 8/2003 |
| JP | 2005295526 | 10/2005 |
| JP | 2005354307 A | 12/2005 |
| KR | 20050112587 | 1/2005 |
| KR | 20050061762 | 6/2005 |

OTHER PUBLICATIONS

Chen et al. "A Fast Bits Estimation Method for Rate-Distortion Optimization in H.264/AVC", Dec. 2004.*
Su et al. "Efficient MPEG-2 to H.264/AVC Intra transcoding in transform-domain", Jul. 2005, IEEE.*
Qiang Wang et al., "Low Complexity RDO Mode Decision Based on a Fast Coding-Bits Estimation Model for H.264/AVC," Circuits and Systems, 2005. ISCAS 2005. IEEE International Symposium on Kobe, Japan May 23-26, 2005, Piscataway, NJ, USA, IEEE, May 23, 2005, pp. 3467-3470.
Wiegand T., "Joint Model No. 1, Revision 1 (JM-IRL)," ITU Study Group 16—Video Coding Experts Group, Dec. 3, 2001, pp. 1, 3-75.
Xin Jun et al., "Efficient Macroblock Coding-Mode Decision for H.264/AVC Video Coding," Proceedings of the Picture Coding Symposium, Dec. 15, 2005, pp. 53-58.

(Continued)

Primary Examiner — Chieh M Fan
Assistant Examiner — Sophia Vlahos
(74) Attorney, Agent, or Firm — Elaine Lo (57) ABSTRACT

An embodiment is directed to a method for selecting a predictive macroblock partition from a plurality of candidate macroblock partitions in motion estimation and compensation in a video encoder including determining a bit rate signal for each of the candidate macroblock partitions, generating a distortion signal for each of the candidate macroblock partitions, calculating a cost for each of the candidate macroblock partitions based on respective bit rate and distortion signals to produce a plurality of costs, and determining a motion vector from the costs. The motion vector designates the predictive macroblock partition.

22 Claims, 5 Drawing Sheets

OTHER PUBLICATIONS

Hallapuro A et al., "Low-Complexity Transform and Quantization in H>264/AVC," IEEE Transactions on Circuits and Systems for Video Technology, IEEE Service Center, Piscataway, NJ, US, vol. 13, No. 7, Jul. 2003, pp. 598-603.

Wahid K A et al., "Error-Free Arithmetic and Architecture for H.264," Signals, Systems and Computers, 2005. Conference Record of the Thirty-Ninth Asilomar Conference on Pacific Grove, California Oct. 28-Nov. 1, Piscataway, NJ, USA, IEEE, Oct. 28, 2005, pp. 703-707.

Chen Q et al., "A Fast Bits Estimation Method for Rate-Distortion Optimization in H.264/AVC," Proceedings of the Picture Coding Symposium, Dec. 15, 2004, pp. 133-137.

International Search Report and Written Opinion—PCT/US2007/061880, International Search Authority—European Patent Office—Aug. 16, 2007.

* cited by examiner

Fig. 1

PRIOR ART

VIDEO ENCODING

BACKGROUND

1. Field

The present application relates to video encoders and cost functions employed therein.

2. Background

Video compression involves compression of digital video data. Video compression is used for efficient coding of video data in video file formats and streaming video formats. Compression is a reversible conversion of data to a format with fewer bits, usually performed so that the data can be stored or transmitted more efficiently. If the inverse of the process, decompression, produces an exact replica of the original data then the compression is lossless. Lossy compression, usually applied to image data, does not allow reproduction of an exact replica of the original image, but it is more efficient. While lossless video compression is possible, in practice it is virtually never used. Standard video data rate reduction involves discarding data.

Video is basically a three-dimensional array of color pixels. Two dimensions serve as spatial (horizontal and vertical) directions of the moving pictures, and one dimension represents the time domain.

A frame is a set of all pixels that (approximately) correspond to a single point in time. Basically, a frame is the same as a still picture. However, in interlaced video, the set of horizontal lines with even numbers and the set with odd numbers are grouped together in fields. The term "picture" can refer to a frame or a field.

Video data contains spatial and temporal redundancy. Similarities can thus be encoded by merely registering differences within a frame (spatial) and/or between frames (temporal). Spatial encoding is performed by taking advantage of the fact that the human eye is unable to distinguish small differences in color as easily as it can changes in brightness, and so very similar areas of color can be "averaged out." With temporal compression, only the changes from one frame to the next are encoded because a large number of the pixels will often be the same on a series of frames.

Video compression typically reduces this redundancy using lossy compression. Usually this is achieved by (a) image compression techniques to reduce spatial redundancy from frames (this is known as intraframe compression or spatial compression) and (b) motion compensation and other techniques to reduce temporal redundancy (known as interframe compression or temporal compression).

Figure 1:
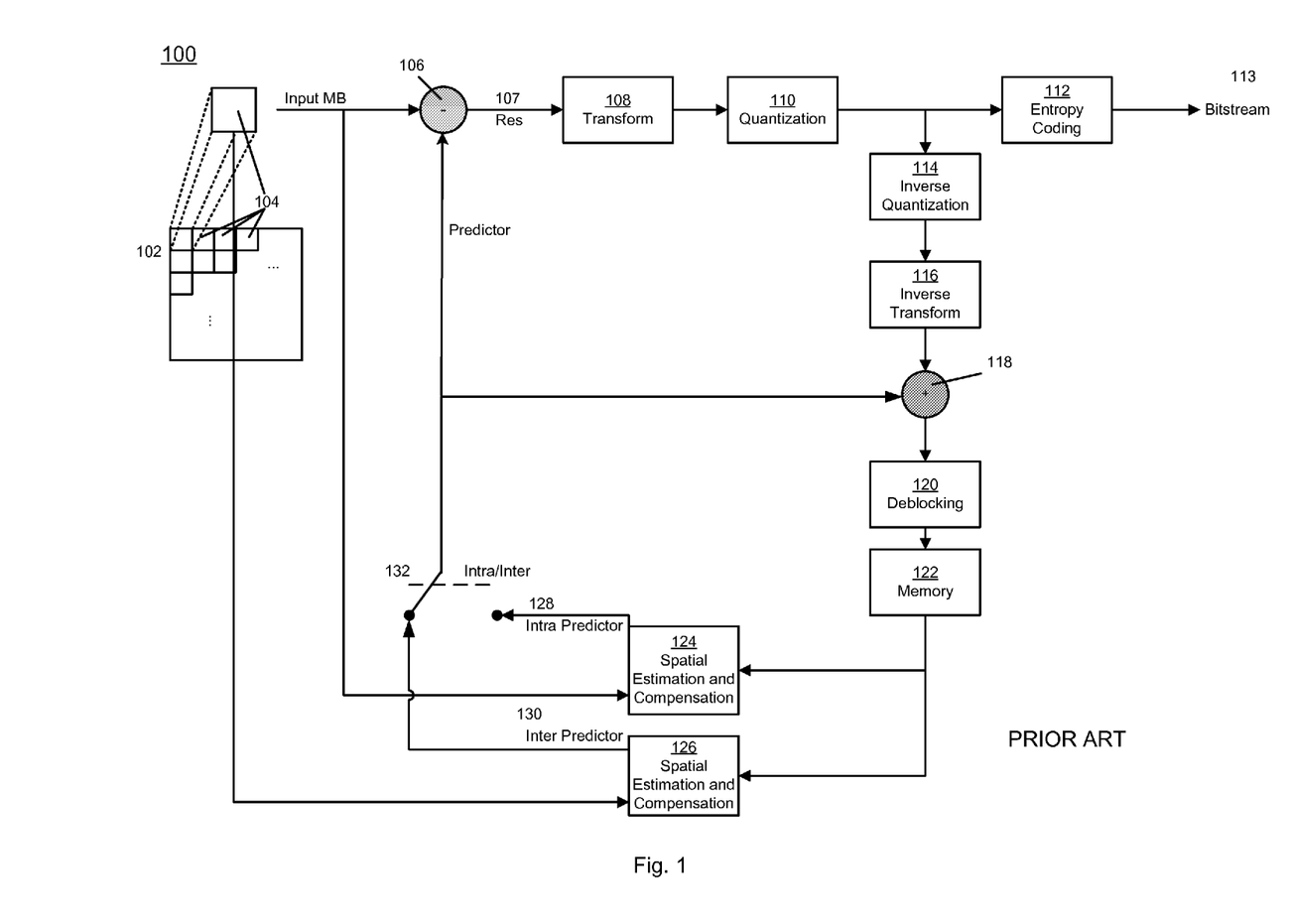
FIG. 1 shows a block diagram of an H.264/AVC video encoder.

H.264/AVC is a video compression standard resulting from joint efforts of ISO (International Standards Organization) and ITU (International Telecommunication Union.) FIG. 1 shows a block diagram for an H.264/AVC encoder. An input video frame 102 is divided into macroblocks 104 and fed into system 100. For each macroblock 104, a predictor 132 is generated and subtracted (as shown by reference numeral 106 of FIG. 1) from the original macroblock 104 to generate a residual 107. This residual 107 is then transformed 108 and quantized 110. The quantized macroblock is then entropy coded 112 to generate a compressed bitstream 113. The quantized macroblock is also inverse-quantized 114, inverse-transformed 116 and added back to the predictor by adder 118. The reconstructed macroblock is filtered on the macroblock edges with a deblocking filter 120 and then stored in memory 122.

Quantization, in principle, involves reducing the dynamic range of the signal. This impacts the number of bits (rate) generated by entropy coding. This also introduces loss in the residual, which causes the original and reconstructed macroblock to differ. This loss is normally referred to as quantization error (distortion). The strength of quantization is determined by a quantization factor parameter. The higher the quantization parameter, the higher the distortion and lower the rate.

As discussed above, the predictor can be of two types—intra 128 and inter 130. Spatial estimation 124 looks at the neighboring macroblocks in a frame to generate the intra predictor 128 from among multiple choices. Motion estimation 126 looks at the previous/future frames to generate the inter predictor 130 from among multiple choices. Inter predictor aims to reduce temporal redundancy. Typically, reducing temporal redundancy has the biggest impact on reducing rate.

Motion estimation may be one of the most computationally expensive blocks in the encoder because of the huge number of potential predictors it has to choose from. Practically, motion estimation involves searching for the inter predictor in a search area comprising a subset of the previous frames. Potential predictors or candidates from the search area are examined on the basis of a cost function or metric. Once the metric is calculated for all the candidates in the search area, the candidate that minimizes the metric is chosen as the inter predictor. Hence, the main factors affecting motion estimation are: search area size, search methodology, and cost function.

Focusing particularly on cost function, a cost function essentially quantifies the redundancy between the original block of the current frame and a candidate block of the search area. The redundancy should ideally be quantified in terms of accurate rate and distortion.

Figure 2:
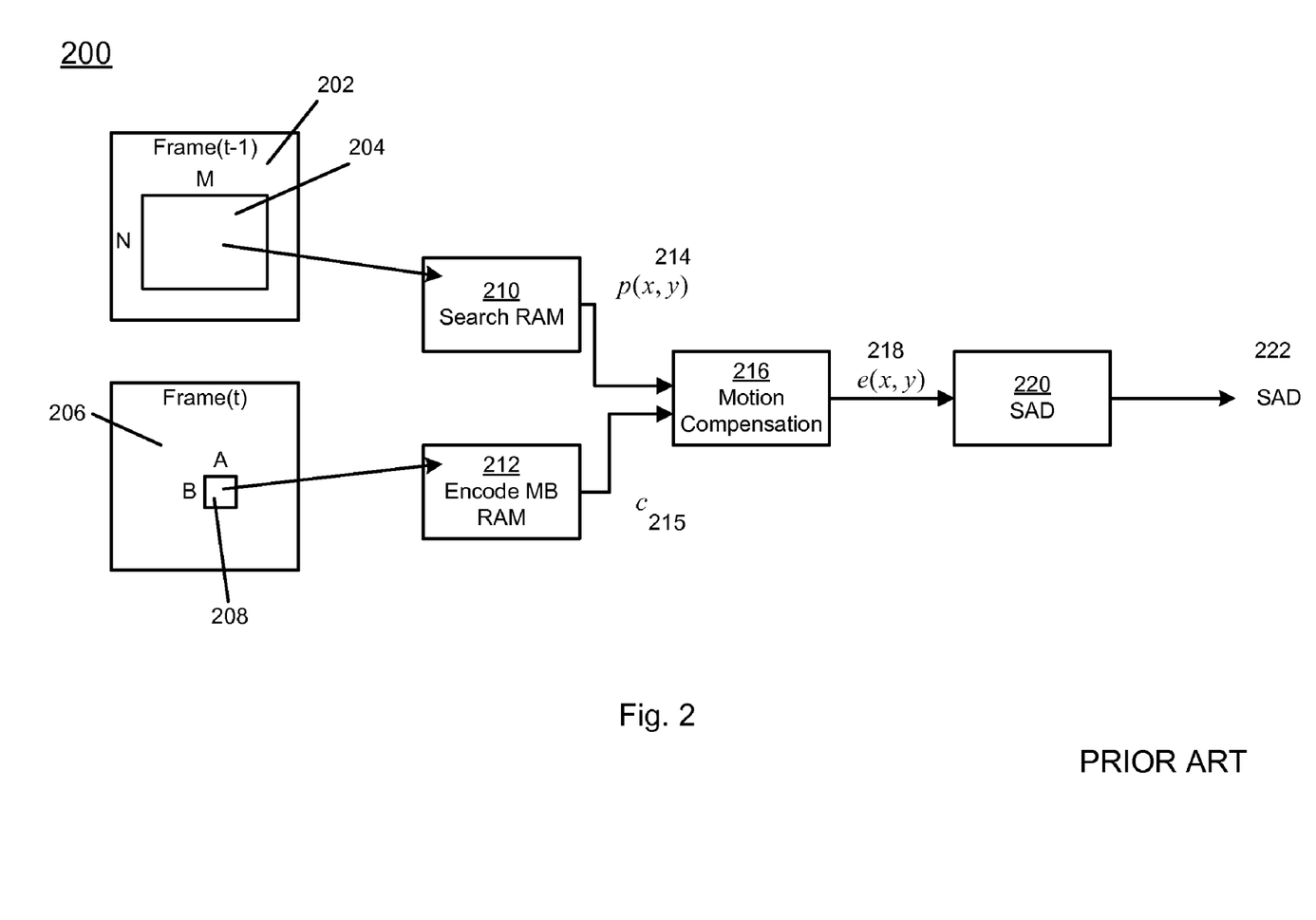
FIG. 2 shows a block diagram of the sum of absolute difference cost function as employed in a standard video encoder.

The cost function employed in current motion estimators is Sum-of-Absolute-Difference (SAD). FIG. 2 shows how SAD is calculated. Frame(t) 206 is the current frame containing a macroblock 208 which is stored in Encode MB (MACROBLOCK) RAM 212. Frame(t−1) 202 is the previous frame containing a search area 204 which is stored in Search RAM 210. It is appreciated that more than one previous frame can be used.

In the example in FIG. 2, the search area 204 size is M×N. Let the size of the blocks being considered be A×B, where A and B are defined in Table 1. Let the given block 208 from the current frame 206 be denoted as c 215. Let each candidate from the search area 204 be denoted as p(x,y) 214, where $x \in [0,N]$ and $y \in [0,M]$. (x,y) represents a position in the search area 214.

TABLE 1

Notations for e(x, y) for different block shapes

| A | B | $z \in \left[0, \dfrac{A \times B}{16} - 1\right]$ | Notation |
|---|---|---|---|
| 4 | 4 | $z \in [0, 0]$ | e(x, y) = [e(x, y, 0)] |
| 8 | 4 | $z \in [0, 1]$ | e(x, y) = [e(x, y, 0) e(x, y, 1)] |

TABLE 1-continued

Notations for e(x, y) for different block shapes

| A | B | $z \in \left[0, \frac{A \times B}{16} - 1\right]$ | Notation |
|---|---|---|---|
| 4 | 8 | $z \in [0, 1]$ | $e(x, y) = \begin{bmatrix} e(x, y, 0) \\ e(x, y, 1) \end{bmatrix}$ |
| 8 | 8 | $z \in [0, 3]$ | $e(x, y) = \begin{bmatrix} e(x, y, 0) & e(x, y, 1) \\ e(x, y, 2) & e(x, y, 3) \end{bmatrix}$ |
| 16 | 8 | $z \in [0, 7]$ | $e(x, y) = \begin{bmatrix} e(x, y, 0) & e(x, y, 1) & e(x, y, 2) & e(x, y, 3) \\ e(x, y, 4) & e(x, y, 5) & e(x, y, 6) & e(x, y, 7) \end{bmatrix}$ |
| 8 | 16 | $z \in [0, 7]$ | $e(x, y) = \begin{bmatrix} e(x, y, 0) & e(x, y, 1) \\ e(x, y, 2) & e(x, y, 3) \\ e(x, y, 4) & e(x, y, 5) \\ e(x, y, 6) & e(x, y, 7) \end{bmatrix}$ |
| 16 | 16 | $z \in [0, 15]$ | $e(x, y) = \begin{bmatrix} e(x, y, 0) & e(x, y, 1) & e(x, y, 2) & e(x, y, 3) \\ e(x, y, 4) & e(x, y, 5) & e(x, y, 6) & e(x, y, 7) \\ e(x, y, 8) & e(x, y, 9) & e(x, y, 10) & e(x, y, 11) \\ e(x, y, 12) & e(x, y, 13) & e(x, y, 14) & e(x, y, 15) \end{bmatrix}$ |

The following steps are calculated to get a motion vector (X,Y):

c is motion compensated 216 for by p(x,y) 214 to get a residual error signal 218, e(x,y)

$$e(x,y) = p(x,y) - c \quad (1)$$

SAD 222 is then calculated 220 from e(x,y).

$$SAD(x, y) = \sum_{i,j} |e(x, y)| \text{ where } i \in [0, A] \text{ and } j \in [0, B] \quad (2)$$

The motion vector (X,Y) is then calculated from SAD(x,y).

$$(X,Y) = (x,y) | \min SAD(x,y) \quad (3)$$

Ideally, the predictor macroblock partition should be the macroblock partition that most closely resembles the macroblock. One of the drawbacks of SAD is that it does not specifically and accurately account for Rate and Distortion. Hence the redundancy is not quantified accurately, and therefore it is possible that the predictive macroblock partition chosen is not the most efficient choice. Thus, in some cases utilizing a SAD approach may actually result in less than optimal performance.

SUMMARY

One embodiment relates to a method for selecting a predictive macroblock partition in motion estimation and compensation in a video encoder including determining a bit rate signal, generating a distortion signal, calculating a cost based on the bit rate signal and the distortion signal, and determining a motion vector from the cost. The motion vector designates the predictive macroblock partition. The method may be implemented in a mobile device such as a mobile phone, digital organizer or lap top computer.

DETAILED DESCRIPTION

Reference will now be made in detail to some embodiments, examples of which are illustrated in the accompanying drawings. It will be understood that the embodiments are not intended to limit the description. On the contrary, the description is intended to cover alternatives, modifications and equivalents, which may be included within the spirit and scope of the description as defined by the claims. Furthermore, in the detailed description, numerous specific details are set forth in order to provide a thorough understanding. However, it may be obvious to one of ordinary skill in the art that the present description may be practiced without these specific details. In other instances, well known methods, procedures, components, and circuits have not been described in detail as not to unnecessarily obscure aspects of the present description.

Some portions of the detailed descriptions that follow are presented in terms of procedures, logic blocks, processing, and other symbolic representations of operations on data bits within a computer or digital system memory. These descriptions and representations are means used by those skilled in the data processing arts to effectively convey the substance of their work to others skilled in the art. A procedure, logic block, process, etc., is herein, and generally, conceived to be a sequence of steps or instructions leading to a desired result.

Unless specifically stated otherwise as apparent from the discussion herein, it is understood that throughout discussions of the embodiments, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission, or display devices.

In general, embodiments of the description below subject candidate macroblock partitions to a series of processes that approximate the processes the macroblock partition would undergo were it actually selected as the predictive macroblock partition (see generally FIG. 1). Doing so allows for accurate approximation of the rate and distortion for each candidate macroblock partition. Embodiments then employ a Lagrangian-based cost function, rather than SAD, to select the candidate macroblock partition that best minimizes costs associated with rate and distortion that occur during the encoding process.

Figure 3:
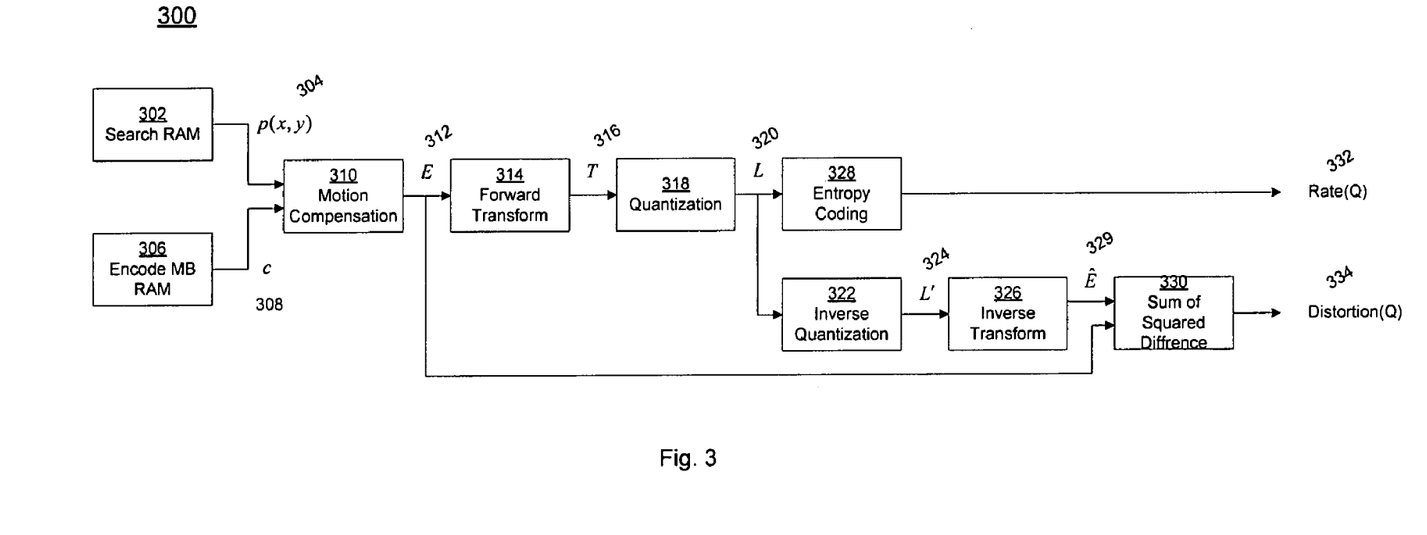
FIG. 3 shows a block diagram of the theoretically optimal solution Rate-Distortion-optimized cost function for a video encoder.

An optimal solution to predictive macroblock partition selection needs to be established to understand where SAD stands and the scope of the gains possible. The optimal solution will guarantee minimum distortion (D) under a rate (R) constraint. Such a solution is found using Lagrangian-based optimization, which combines Rate and Distortion as D+λR. λ is the Lagrangian multiplier that represents the tradeoff between rate and distortion. FIG. 3 shows a block diagram 300 of the optimal solution for an RD-optimized cost function. In order to calculate rate 332 and distortion 334 accurately, the entire encoding process should be carried out for each of the candidate blocks 304, as shown in FIG. 3 and described below.

The current frame 308 is motion compensated 310 for by the candidate macroblock partitions 304 to get a residual error signal e(x,y) as shown in (1). The current frame 308 and the candidate macroblock partitions 304 are provided from encoded MB random access memory (RAM) 306 and search RAM 302, respectively.

e(x,y) is divided into an integral number of 4×4 blocks e(x,y,z) 312 where $$z \in \left[0, \frac{A \times B}{16} - 1\right].$$

The size of e(x,y) is A×B. The values that A and B can take are shown in Table 1. Let e(x,y,z) be denoted by E.

TABLE 1

Notations for e(x, y) for different block shapes

| A | B | $z \in \left[0, \frac{A \times B}{16} - 1\right]$ | Notation |
|---|---|---|---|
| 4 | 4 | z∈[0, 0] | e(x, y) = [e(x, y, 0)] |
| 8 | 4 | z∈[0, 1] | e(x, y) = [e(x, y, 0) e(x, y, 1)] |
| 4 | 8 | z∈[0, 1] | $e(x, y) = \begin{bmatrix} e(x, y, 0) \\ e(x, y, 1) \end{bmatrix}$ |
| 8 | 8 | z∈[0, 3] | $e(x, y) = \begin{bmatrix} e(x, y, 0) & e(x, y, 1) \\ e(x, y, 2) & e(x, y, 3) \end{bmatrix}$ |
| 16 | 8 | z∈[0, 7] | $e(x, y) = \begin{bmatrix} e(x, y, 0) & e(x, y, 1) & e(x, y, 2) & e(x, y, 3) \\ e(x, y, 4) & e(x, y, 5) & e(x, y, 6) & e(x, y, 7) \end{bmatrix}$ |
| 8 | 16 | z∈[0, 7] | $e(x, y) = \begin{bmatrix} e(x, y, 0) & e(x, y, 1) \\ e(x, y, 2) & e(x, y, 3) \\ e(x, y, 4) & e(x, y, 5) \\ e(x, y, 6) & e(x, y, 7) \end{bmatrix}$ |
| 16 | 16 | z∈[0, 15] | $e(x, y) = \begin{bmatrix} e(x, y, 0) & e(x, y, 1) & e(x, y, 2) & e(x, y, 3) \\ e(x, y, 4) & e(x, y, 5) & e(x, y, 6) & e(x, y, 7) \\ e(x, y, 8) & e(x, y, 9) & e(x, y, 10) & e(x, y, 11) \\ e(x, y, 12) & e(x, y, 13) & e(x, y, 14) & e(x, y, 15) \end{bmatrix}$ |

E 312 is transformed 314 into the frequency domain from the spatial domain. Let the transformed block be denoted as t(x,y,z) or T 316. Since the transform is separable, it is applied in two stages, horizontal (4) and vertical (5) on E 312. E' represents the intermediate output. D represents the transform matrix shown in (6).

$$E'(i, j) = \sum_{k=0}^{3} E(i, k) \times D(k, j) \text{ where } i, j \in [0, 3] \quad (4)$$

$$T(i, j) = \sum_{k=0}^{3} E'(k, j) \times D(i, k) \text{ where } i, j \in [0, 3] \quad (5)$$

$$D = \begin{bmatrix} 1 & 1 & 1 & 1 \\ 2 & 1 & -1 & -2 \\ 1 & -1 & -1 & 1 \\ 1 & -2 & 2 & -1 \end{bmatrix} \quad (6)$$

T 316 is quantized 318 with a quantization parameter Q, which is predetermined. Let the quantization block be denoted by l(x,y,z) or L 320.

$$L(i, j) = (T(i, j) \times M(i, j) + R) >> S \text{ where } i, j \in [0, 3] \quad (7)$$

$$M = \begin{bmatrix} f & g & f & g \\ g & h & g & h \\ f & g & f & g \\ g & h & g & h \end{bmatrix} \quad (8)$$

$$S = 15 + \frac{Q}{6} \quad (9)$$

$$R = \frac{2^S}{3} \quad (10)$$

The values for the elements of M are derived from a table known in the art. A sample of the table is shown in Table 2.

TABLE 2

Values for Multiplication Factor (M) for H.264 Quantization

| Q %6 | f | g | h |
|---|---|---|---|
| 0 | 13107 | 8066 | 5243 |
| 1 | 11916 | 7490 | 4660 |
| 2 | 10082 | 6554 | 4194 |
| 3 | 9362 | 5825 | 3647 |
| 4 | 8192 | 5243 | 3355 |
| 5 | 7282 | 4559 | 2893 |

Next, L 320 is entropy coded 328 using a context-adaptive variable length coding (CAVLC) scheme. This generates the number of bits taken to represent l(x,y,z), which is denoted as Rate(x,y,z,Q) or Rate(Q) 332.

$$\text{Rate}(x,y,z,Q) = \text{CAVLC}(l(x,y,z,Q)) \quad (11)$$

It should be appreciated by one skilled in the art that CAVLC is known in the art and that another entropy coding algorithm may be used in its place.

L 320 is inverse quantized 322 with quantization parameter Q. Let the inverse quantized block be denoted by $\hat{l}(x,y,z)$ or $\hat{L}$ 324.

$$\hat{L}(i, j) = (L(i, j) \times \hat{M}(i, j)) << S \text{ where } i, j \in [0, 3] \quad (12)$$

$$\hat{M} = \begin{bmatrix} \hat{f} & \hat{g} & \hat{f} & \hat{g} \\ \hat{g} & \hat{h} & \hat{g} & \hat{h} \\ \hat{f} & \hat{g} & \hat{f} & \hat{g} \\ \hat{g} & \hat{h} & \hat{g} & \hat{h} \end{bmatrix} \quad (13)$$

The values for the elements of $\hat{M}$ are derived from a table known in the art. A sample of the table is shown in Table 3.

TABLE 3

Values for Multiplication Factor ($\hat{M}$) for H.264 Inverse Quantization

| Q %6 | $\hat{f}$ | $\hat{g}$ | $\hat{h}$ |
|---|---|---|---|
| 0 | 10 | 13 | 16 |
| 1 | 11 | 14 | 18 |
| 2 | 13 | 16 | 20 |
| 3 | 14 | 18 | 23 |
| 4 | 16 | 20 | 25 |
| 5 | 18 | 23 | 29 |

$\hat{L}$ is transformed from the frequency domain to the spatial domain 326. Let the transformed block be denoted by ê(x,y,z,Q) or $\hat{E}$ 329. Since the transform is separable, it is applied in two stages, horizontal (14) and vertical (15), on $\hat{L}$. L' represented the intermediate output. $\hat{D}$ represents the transform matrix shown in (16).

$$L'(i, j) = \sum_{k=0}^{3} \hat{L}(i, k) \times \hat{D}(k, j) \text{ where } i, j \in [0, 3] \quad (14)$$

$$\hat{E}(i, j) = \sum_{k=0}^{3} L'(k, j) \times \hat{D}(i, k) \text{ where } i, j \in [0, 3] \quad (15)$$

$$\hat{D} = \begin{bmatrix} 1 & 1 & 1 & 1 \\ 1 & 1/2 & -1/2 & -1 \\ 1 & -1 & -1 & 1 \\ 1/2 & -1 & 1 & -1/2 \end{bmatrix} \quad (16)$$

The squared-error between $\hat{E}$ and E (as shown by sum of squared difference 330) represents the Distortion 334, Distortion(x,y,z,Q) or Distortion(Q).

$$\text{Distortion}(x, y, z, Q) = \sum_{i,j} (\hat{E}(i, j) - E(i, j))^2 \quad (17)$$

where $i, j \in [0, 3]$

The Lagrangian cost Cost4×4(x,y,z,Q,λ) is calculated for a predefined λ.

$$\text{Cost4×4}(x,y,z,Q,\lambda) = \text{Distortion}(x,y,z,Q) + \lambda \times \text{Rate}(x,y,z,Q) \quad (18)$$

The total cost for p(x,y) is given by:

$$\text{Cost}(x, y, Q, \lambda) = \sum_{z} \text{Cost4×4}(x, y, z, Q, \lambda) \quad (19)$$

where $z \in \left[0, \frac{A \times B}{16} - 1\right]$

The motion vector (X,Y) is then calculated as follows.

$$(X,Y) = (x,y) | \min \text{Cost}(x,y,Q,\lambda) \quad (20)$$

The optimal solution just described maybe too complex to be practical even though it provides the best solution possible. Embodiments of the present description introduce a new cost function that represents a computational approximation of the optimal solution. This computational approximation may have an insignificant impact on the results of the optimal solution while significantly reducing the complexity of the same.

Figure 4:
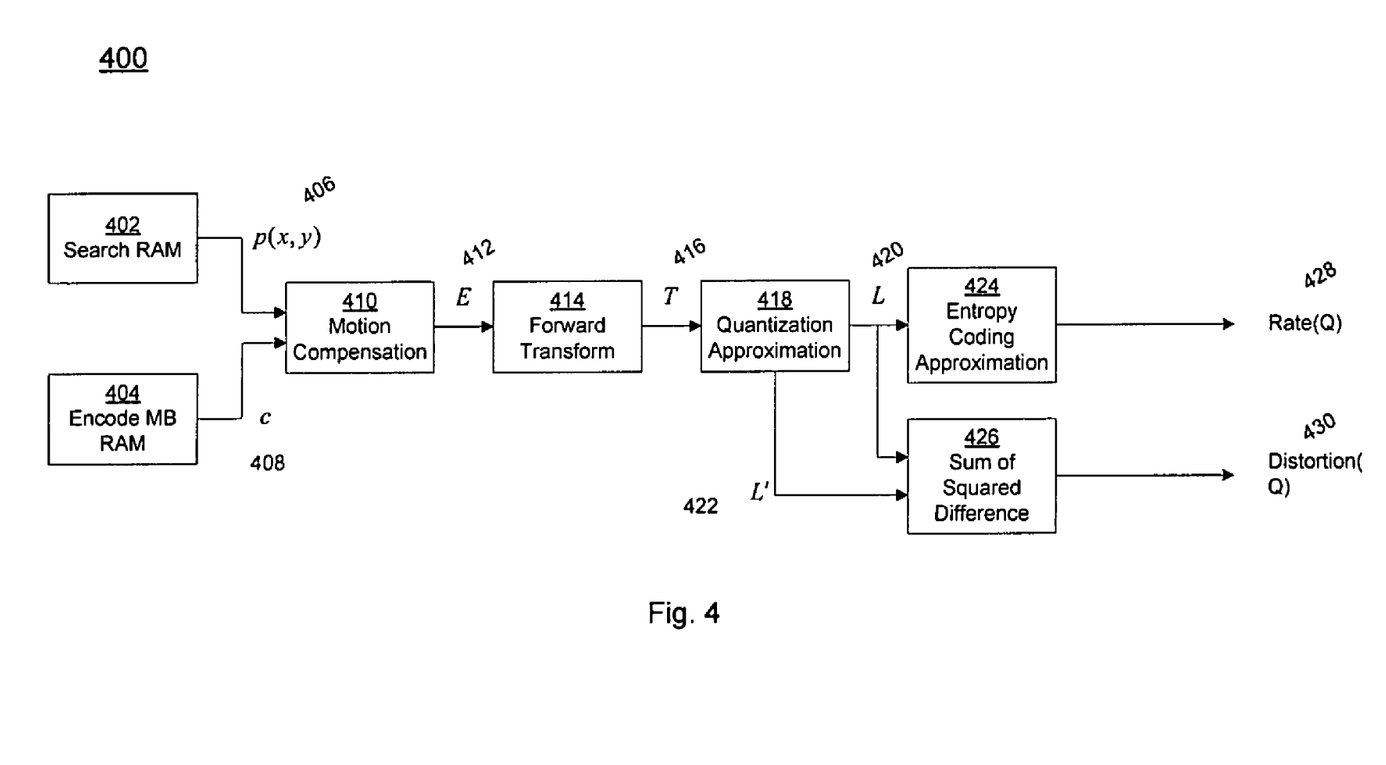
FIG. 4 shows a block diagram of a Rate-Distortion-optimized cost function for a video encoder.

FIG. 4 shows a block diagram 400 of an embodiment. Just as with the optimal solution, the current frame 408 is motion compensated 410 for by the candidate macroblock partitions 406 to get the residual error signal, e(x,y). The current fram 404 and the candidate macroblock partitions 406 are provided from encoded MB RAM 408 and search RAM 402, respectively. e(x,y) is then divided into an integral number of four by four blocks, e(x,y,z) or E 412, as shown in Table 1. E 412 is then transformed 414 into the frequency domain from the spatial domain as shown in (4), (5), and (6) to get t(x,y,z) or T 416.

According to the optimal solution, T would now be quantized. However, the quantization process is computationally complex because it involves multiplication and other complex binary functions. Thus in one embodiment, the multiplication of T and M from (7) is approximated through a series of shifts and adds as follows:

$$M(i,j) \times T(i,j) = (T(i,j) << a + \text{Sign}(T(i,j) << b, \bar{b}) + \text{Sign}(T(i,j) << c, \bar{c})) >> d \quad (21)$$

Thus, (7) can be rewritten as the quantization approximation 418:

$$L(i,j) = ((T(i,j) << a + \text{Sign}(T(i,j) << b, \bar{b}) + \text{Sign}(T(i,j) << c, \bar{c})) >> d + R) >> S \quad (22)$$

where $i,j \in [0,3]$, and where Sign(x) is 1 when x is negative and 0 when positive S and R can be determined from (9) and (10). The multiplication factor M is approximated with $\tilde{M}$. The values of a, b, c, d, $\bar{b}$, and $\bar{c}$ are found in Table 4 and Table 5 for a corresponding first quantization approximation parameter and corresponding elements of the approximate multiplication factor $\tilde{M}$.

TABLE 4

(a, b, c, d) shift values for a given value of the Multiplication Approximation Factor (M) for quantization approximation $$\tilde{M} = \begin{bmatrix} \tilde{f} & \tilde{g} & \tilde{f} & \tilde{g} \\ \tilde{g} & \tilde{h} & \tilde{g} & \tilde{h} \\ \tilde{f} & \tilde{g} & \tilde{f} & \tilde{g} \\ \tilde{g} & \tilde{h} & \tilde{g} & \tilde{h} \end{bmatrix} \quad (23)$$

| | $\tilde{f}$ | | | | $\tilde{g}$ | | | | $\tilde{h}$ | | | |
|---|---|---|---|---|---|---|---|---|---|---|---|---|
| QP %6 | a | b | c | d | a | b | c | d | a | b | c | d |
| 0 | 11 | 13 | 14 | 1 | 13 | 0 | 7 | 0 | 12 | 10 | 7 | 0 |
| 1 | 13 | 14 | 10 | 1 | 14 | 10 | 9 | 1 | 12 | 9 | 0 | 0 |
| 2 | 13 | 11 | 0 | 0 | 12 | 11 | 9 | 0 | 12 | 7 | 0 | 0 |
| 3 | 13 | 10 | 0 | 0 | 14 | 13 | 10 | 2 | 12 | 0 | 9 | 0 |
| 4 | 13 | 0 | 0 | 0 | 14 | 12 | 9 | 2 | 11 | 10 | 8 | 0 |
| 5 | 13 | 7 | 10 | 0 | 12 | 9 | 0 | 0 | 11 | 9 | 8 | 0 |

TABLE 5

($\bar{b}$, $\bar{c}$) sign values for a given value of the Multiplication Approximation Factor (M) for quantization approximation

| | $\tilde{f}$ | | $\tilde{g}$ | | $\tilde{h}$ | |
|---|---|---|---|---|---|---|
| QP %6 | $\bar{b}$ | $\bar{c}$ | $\bar{b}$ | $\bar{c}$ | $\bar{b}$ | $\bar{c}$ |
| 0 | 0 | 0 | 0 | 1 | 0 | 0 |
| 1 | 0 | 1 | 1 | 1 | 0 | 0 |
| 2 | 0 | 0 | 0 | 0 | 0 | 0 |
| 3 | 0 | 0 | 0 | 1 | 0 | 1 |
| 4 | 0 | 0 | 0 | 0 | 0 | 0 |
| 5 | 0 | 1 | 0 | 0 | 0 | 0 |

According to the optimal solution, the quantization approximation block 420 would then be entropy coded to produce the rate signal 428. However, entropy coding algorithms such as CAVLC are highly computationally demanding operations. Entropy coding of a 4×4 quantized block involves encoding a Token (indicates the number of non-zero coefficients and the number of trailing 1's), signs or the trailing 1's, Levels of the non-zero coefficients, and Runs of zeros between non-zero coefficients. In one embodiment, the entropy coding is eliminated by using the Fast Bits Estimation Method (FBEM) to estimate the rate. According to FBEM, the number of bits taken by the different elements can be derived from the number of non-zero coefficients ($N_C$), the number of zeros ($N_Z$), and the sum of absolute levels (SAL).

$$\text{Rate}(x, y, z, Q) = \text{Token\_Bits} + \text{Sign\_Bits} + \text{Level\_Bits} + \text{Run\_Bits} \quad (24)$$

$$\text{Token\_Bits} = N_c \quad (25)$$

$$\text{Sign\_Bits} = N_c \quad (26)$$

$$\text{Level\_Bits} = SAL \quad (27)$$

$$\text{Run\_Bits} = N_c + N_z \quad (28)$$

$$N_c = \sum_{i=0}^{n} (\text{Scan}(l(x, y, z, Q)) \ != 0) \quad (29)$$

where Scan( ) represents the zig-zag scan $$N_z = \sum_{i=0}^{n} (\text{Scan}(l(x, y, z, Q)) == 0) \quad (30)$$

where Scan( ) represents the zig-zag scan $$SAL = \sum_{i=0}^{16} |l(x, y, z, Q)| \quad (31)$$

Thus, a Rate 428 can be determined for each candidate macroblock partition 406 through an entropy coding approximation 424.

According to the optimal solution, L would also need to be inverse-quantized 322 and inverse-transformed 326. Similar to quantization, inverse quantization is also computationally complex. In one embodiment, these processes are simplified through an inverse quantization approximation. The inverse quantization approximation is achieved by performing the same steps as the quantization approximation, but with a second quantization parameter.

$$L'(i,j)=((T(i,j)<<a+\text{Sign}(T(i,j)<<b,\overline{b})+\text{Sign}(T(i,j)<<c,\overline{c}))>>d+R)>>S \quad (32)$$

In one embodiment, the second quantization parameter is chosen such that S=15, which approximates the equivalent to calculating the zero-distortion value.

By doing the above steps, inverse quantization 322 has been significantly simplified and inverse transformation 326 is no longer necessary. It is appreciated that because embodiments achieve the inverse quantization approximation through quantization approximation with a second quantization parameter, both L and L' can be generated from the same circuitry, module, etc.

In one embodiment, once the inverse quantization approximation block L' 422 has been generated, the Distortion 430, Distortion(x,y,z,Q) or Distortion(Q), can be represented by the squared-error between L' and L (as shown by sum of squared difference 426). (L'-L) represents the quantization error and has a small dynamic range. Hence embodiments can store the squared values in a lookup-table to avoid the squaring operation.

$$\text{Distortion}(x, y, z, Q) = \sum_{i,j} (L'(i, j) - L(i, j))^2 \quad (33)$$

In one embodiment, the Lagrangian cost for each of the integral number of four by four blocks Cost4×4(x,y,z,Q,λ) is calculated for a predefined λ.

$$\text{Cost4x4}(x,y,z,Q,\lambda)=\text{Distortion}(x,y,z,Q)+\lambda \times \text{Rate}(x,y,z,Q) \quad (34)$$

In one embodiment, the total cost for p(x,y) is given by:

$$\text{Cost}(x, y, Q, \lambda) = \sum_z \text{Cost4x4}(x, y, z, Q, \lambda) \text{ where } z \in \left[0, \frac{A \times B}{16}\right] \quad (35)$$

Finally, the motion vector (X,Y) is then selected as follows:

$$(X,Y)=(x,y)|\min \text{Cost}(x,y,Q,\lambda) \quad (36)$$

Figure 5:
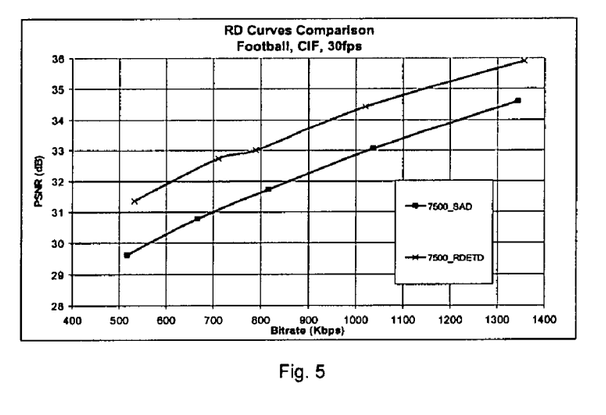
FIG. 5 shows a first graphical illustration of the performance of a video encoder using the sum of absolute difference cost function as compared to a video encoder using a cost function.
Figure 6:
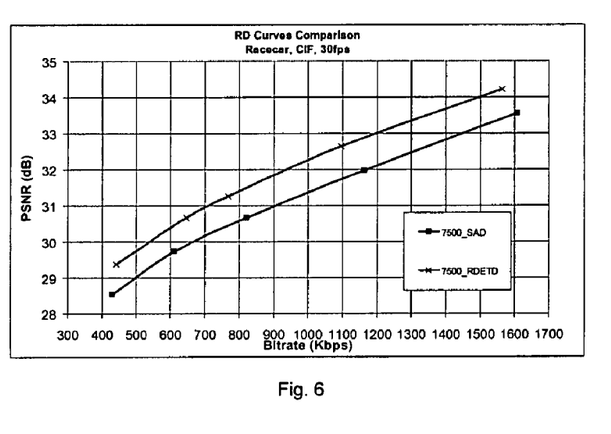
FIG. 6 shows a second graphical illustration of the performance of a video encoder using the sum of absolute difference cost function as compared to a video encoder using a cost function

Thus, the above embodiments are able to accurately approximate the rate and distortion for each candidate macroblock partition. The embodiments may select the best possible predictive macroblock partition with more certainty than the SAD cost function because the selection process specifically account for Rate and Distortion. Therefore, the embodiments are able to achieve a higher signal to noise ratio than SAD for a given bitrate, as illustrated in FIG. 5 and FIG. 6.

The previous description of the disclosed embodiments is provided to enable any person skilled in the art to make or use the present description. Various modifications to these embodiments may be readily apparent to those skilled in the art, and the generic principles defined herein may be applied to other embodiments without departing from the spirit or scope of the description. Thus, the present description is not intended to be limited to the embodiments shown herein but is to be accorded the widest scope consistent with the principles and novel features disclosed herein.

What is claimed is:

1. A method for selecting a predictive macroblock partition in motion estimation and compensation in a video encoder comprising:

determining a bit rate signal, wherein determining said bit rate signal comprises:
generating a residual error signal by subtracting a macroblock of a current frame from a section of a search area;
dividing said residual error signal into an integral number of blocks;
transforming said integral number of blocks into the frequency domain from the spatial domain to create a transform of said integral number of blocks;
generating a quantization approximation block through a first combination of shifts and adds of said transform of said integral number of blocks, said quantization approximation block having a number of non-zero coefficients and a number of zero value coefficients, wherein said first combination of shifts and adds is based on a first quantization parameter;
calculating a sum of absolute levels of said quantization approximation block; and
calculating said bit rate signal for said quantization block by summing three times said number of non-zero coefficients plus said number of zero-value coefficients plus said sum of absolute levels;
generating a distortion signal, wherein said generating of said distortion signal comprises;
generating an inverse quantization approximation block through a second combination of shifts and adds of said transform of said integral number of blocks, wherein said second combination of shifts and adds is based on a second quantization parameter; and
determining a squared-error between said quantization approximation block and said inverse quantization approximation block, wherein said distortion signal equals said squared-error;
calculating a cost based on said bit rate signal and said distortion signal; and
determining a motion vector from said cost, wherein said motion vector designates said predictive macroblock partition.

2. The method as recited in claim 1 wherein said blocks of said integral number of blocks have dimension of four pixels by four pixels.

3. The method as recited in claim 1 further comprising:
storing possible values of said squared error in a lookup-table in a memory.

4. The method as recited in claim 1 wherein said calculating of said cost comprises:
calculating a Lagrangian cost by summing said distortion signal and said bit rate signal multiplied by a Lagrangian multiplier; and
performing a summation of said Lagrangian cost over each of said integral number of blocks, wherein said cost is equal to said summation.

5. The method as recited in claim 4 wherein said blocks of said integral number of blocks have dimension of four pixels by four pixels.

6. The method as recited in claim 1 wherein said determining of said motion vector comprises:
scanning said cost for a lowest value, wherein said motion vector is defined as a vector corresponding to said lowest value.

7. The method as recited in claim 1 wherein said video encoder is an H.264/AVC encoder.

8. A method for selecting a predictive macroblock partition from a plurality of candidate macroblock partitions in motion estimation and compensation in a video encoder comprising:

determining a bit rate signal for each of said candidate macroblock partitions wherein determining said bit rate signal comprises:
   per candidate macroblock partition, generating a residual error signal by subtracting a macroblock of a current frame from a respective candidate macroblock partition;
   per candidate macroblock partition, dividing a respective residual error signal into an integral number of blocks;
   per candidate macroblock partition, transforming a respective integral number of blocks into the frequency domain from the spatial domain, creating a plurality of transforms;
   per transform, generating a quantization approximation block through a first combination of shifts and adds of a respective transform, said quantization approximation block having a number of non-zero coefficients and a number of zero value coefficients, wherein said first combination of shifts and adds is based on a first quantization parameter;
   per transform, calculating a sum of absolute levels of said quantization approximation block; and
   per transform, calculating said bit rate signal by summing three times a respective number of non-zero coefficients plus a respective number of zero-value coefficients plus a respective sum of absolute levels;
generating a distortion signal for each of said candidate macroblock partitions, wherein said generating of said distortion signal comprises: per transform, generating an inverse quantization approximation block through a second combination of shifts and adds of the respective transform, wherein said second combination of shifts and adds is based on a second quantization parameter; and per transform, determining a squared-error between the respective quantization per transform, generating an inverse quantization approximation block wherein said distortion signal equals said squared-error;
calculating a cost for each of said candidate macroblock partitions based on a respective bit rate signal and a respective distortion signal to produce a plurality of costs; and
determining a motion vector from said costs, wherein said motion vector designates said predictive macroblock partition.

9. The method as recited in claim 8 wherein said blocks of said integral number of blocks have dimension of four pixels by four pixels.

10. The method as recited in claim 8 further comprising:
   storing possible values of said squared error in a lookup-table in a memory.

11. The method as recited in claim 10 wherein each of said candidate macroblock partitions has an integral number of blocks, wherein each of said blocks has a respective bit rate signal and a respective distortion signal, and wherein said calculating of said cost comprises:
   per block, calculating a Lagrangian cost by summing the respective distortion signal and the respective bit rate signal multiplied by a Lagrangian multiplier; and
   per candidate macroblock partition, producing said cost by summing a respective Lagrangian cost of a respective block.

12. The method as recited in claim 11 wherein said blocks have dimension of four pixels by four pixels.

13. The method as recited in claim 8 wherein said determining of said motion vector comprises:
   scanning said costs for a lowest value, wherein said motion vector corresponding to a respective candidate macroblock partition of said lowest value.

14. The method as recited in claim 8 wherein said video encoder is an H.264/AVC encoder.

15. An apparatus for selecting a predictive macroblock partition in motion estimation and compensation in a video encoder comprising:
   a motion compensation block to receive a macroblock of a current frame and an M by N search area and generate a residual error signal, wherein M represents a first dimension of the search area and N represents a second dimension of the search area;
   a forward transform block coupled with said motion compensation block to receive said residual error signal and transform said residual error signal into a frequency-domain residual error signal;
   a quantization approximation block coupled with said forward transform block to receive said frequency-domain residual error signal and generate an approximated quantization signal based on a first quantization parameter and generate an approximated inverse quantization signal based on a second quantization parameter;
   an entropy coding approximation block coupled with said quantization approximation block to receive said approximated quantization signal and generate a rate signal, wherein said rate signal is used in selecting said predictive macroblock partition; and
   a sum of squared difference block coupled with said quantization approximation block to receive said approximated quantization signal and said approximated inverse quantization signal and generate a distortion signal, wherein said distortion signal is used in selecting said predictive macroblock partition, and
   wherein said M by N search area comprises a plurality of candidate macroblock partitions, wherein said approximated quantization signal comprises a plurality of approximated quantization sub-signals, wherein each of said approximated quantization sub-signals corresponds to one of said candidate macroblock partitions and has a number of non-zero coefficients and a number of zero-value coefficients, wherein said entropy coding approximation block generates a rate sub-signal for each approximated quantization sub-signal by calculating a sum of absolute levels of a respective approximated quantization sub-signal and summing a respective sum of absolute levels plus three times respective number of non-zero coefficients plus a respective number of zero-value coefficients, producing a first plurality of approximated quantization sub-signals, wherein said approximated quantization signal comprises said first plurality of approximated quantization sub-signals wherein said approximated inverse quantization signal comprises a plurality of approximated inverse quantization sub-signals, wherein each of said approximated inverse quantization sub-signals corresponds to one of said candidate macroblock partitions, wherein said sum of squared difference block generates a distortion sub-signal for each candidate macroblock partition by determining a squared-error between said approximated quantization sub-signal and said approximated inverse quantization sub-signal to produce a plurality of distortion sub-signals, wherein said distortion signal comprises said plurality of distortion sub-signals.

16. The apparatus as recited in claim 15 further comprising:
a cost determination block coupled with said entropy coding approximation block and said sum of squared difference block, wherein said cost determination block receives said rate signal and said distortion signal and generates a motion vector.

17. The apparatus as recited in claim 15 wherein said motion compensation block generates said residual error signal per candidate macroblock partition by subtracting said macroblock from a respective candidate macroblock partition.

18. The apparatus as recited in claim 15 wherein said frequency-domain residual error signal comprises a plurality of frequency-domain residual error sub-signals, wherein each frequency-domain residual error sub-signal corresponds to one of said candidate macroblock partitions, wherein said quantization approximation block generates an approximated quantization sub-signal for each frequency-domain residual error sub-signal through a combination of shifts and adds of a respective frequency-domain residual error sub-signal based on said first quantization parameter, producing a second plurality of approximated quantization sub-signals, wherein said approximated quantization signal comprises said second plurality of approximated quantization sub-signals.

19. The apparatus as recited in claim 15 wherein said frequency-domain residual error signal comprises a plurality of frequency-domain residual error sub-signals, wherein each frequency-domain residual error sub-signal corresponds to one of said candidate macroblock partitions, wherein said quantization approximation block generates an approximated inverse quantization sub-signal for each frequency-domain residual error sub-signal through a combination of shifts and adds of a respective frequency-domain residual error sub-signal based on said second quantization parameter, producing a plurality of approximated inverse quantization sub-signals, wherein said approximated inverse quantization signal comprises said plurality of approximated inverse quantization sub-signals.

20. The apparatus as recited in claim 15 further comprising
a memory coupled with said sum of squared difference block for storing possible values of said squared error in a lookup-table.

21. The apparatus as recited in claim 16 wherein said rate signal comprises a plurality of rate sub-signals, wherein each of said rate sub-signals corresponds to one of said candidate macroblock partitions, wherein said distortion signal comprises a plurality of distortion sub-signals, wherein each of said distortion sub-signals corresponds to one of said candidate macroblock partitions, wherein said cost determination block generates said motion vector by calculating a Lagrangian cost for each candidate macroblock partition by summing a respective distortion signal and a respective rate signal multiplied by a Lagrangian multiplier, producing a plurality of Lagrangian costs, and scanning said Lagrangian costs for a lowest value, wherein said motion vector is defined as a vector corresponding to a respective candidate macroblock partition of said lowest value.

22. The apparatus as recited in claim 15 wherein said video encoder is an H.264/AVC encoder.

* * * * *